United States Patent
Kim et al.

(10) Patent No.: US 7,697,639 B2
(45) Date of Patent: Apr. 13, 2010

(54) APPARATUS AND METHOD FOR ROBUST BPSK/QPSK BLIND MODULATION CLASSIFICATION AGAINST ERRORS IN SATELLITE CONTROL SYSTEM

(75) Inventors: Il-Han Kim, Chungbuk (KR); Joon-Gyu Ryu, Daejon (KR); Ho-Kyom Kim, Daejon (KR); Deock-Gil Oh, Daejon (KR)

(73) Assignee: Electronics and Telecommunications Research Institute (KR)

( * ) Notice: Subject to any disclaimer, the term of this patent is extended or adjusted under 35 U.S.C. 154(b) by 627 days.

(21) Appl. No.: 11/442,078

(22) Filed: May 25, 2006

(65) Prior Publication Data

US 2007/0092041 A1    Apr. 26, 2007

(30) Foreign Application Priority Data

May 25, 2005    (KR) ...................... 10-2005-0043905

(51) Int. Cl.
*H03D 3/22* (2006.01)
(52) U.S. Cl. ................. 375/329; 259/267; 259/261; 259/316; 259/341; 455/205; 455/296
(58) Field of Classification Search ................ 375/259, 375/329, 267, 261, 316, 341; 455/205, 296
See application file for complete search history.

(56) References Cited

U.S. PATENT DOCUMENTS

| 7,298,784 | B2 * | 11/2007 | Matsusaka ................... 375/259 |
| 2005/0003756 | A1 | 1/2005 | Sun et al. |
| 2005/0063487 | A1 | 3/2005 | Sayegh |
| 2007/0223616 | A1 * | 9/2007 | Miyoshi et al. ............. 375/267 |

OTHER PUBLICATIONS

A New Maximum-Likelihood Method for Modulation Classification, 1996, pp. 1132-1136.
IEE Transactions on Communications, vol. 43, No. 2/3/4, Feb./Mar./Apr. 1995, pp. 1493-1504.

* cited by examiner

*Primary Examiner*—Chieh M. Fan
*Assistant Examiner*—Eva Y. Puente
(74) *Attorney, Agent, or Firm*—Blakely, Sokoloff, Taylor & Zafman

(57) ABSTRACT

Provided are an apparatus and method for robust Binary Phase Shift Keying/Quadrature Phase Shift Keying (BPSK/QPSK) blind modulation classification. The apparatus includes first and second likelihood value calculators for calculating a likelihood value of a received baseband signal each for of BPSK and QPSK modulation modes. A maximum setting unit derives a maximum value of the likelihood values or $i^{th}$ likelihood ratios calculated by the first and second likelihood value calculators. A flag is set for the maximum value to "1" and a flag for the remaining value is set to "0". First and second flag combining units combine the flags for the modulation modes. A modulation mode flag setting unit selects a maximum value from the flags combined by the first and second flag combining units.

9 Claims, 6 Drawing Sheets

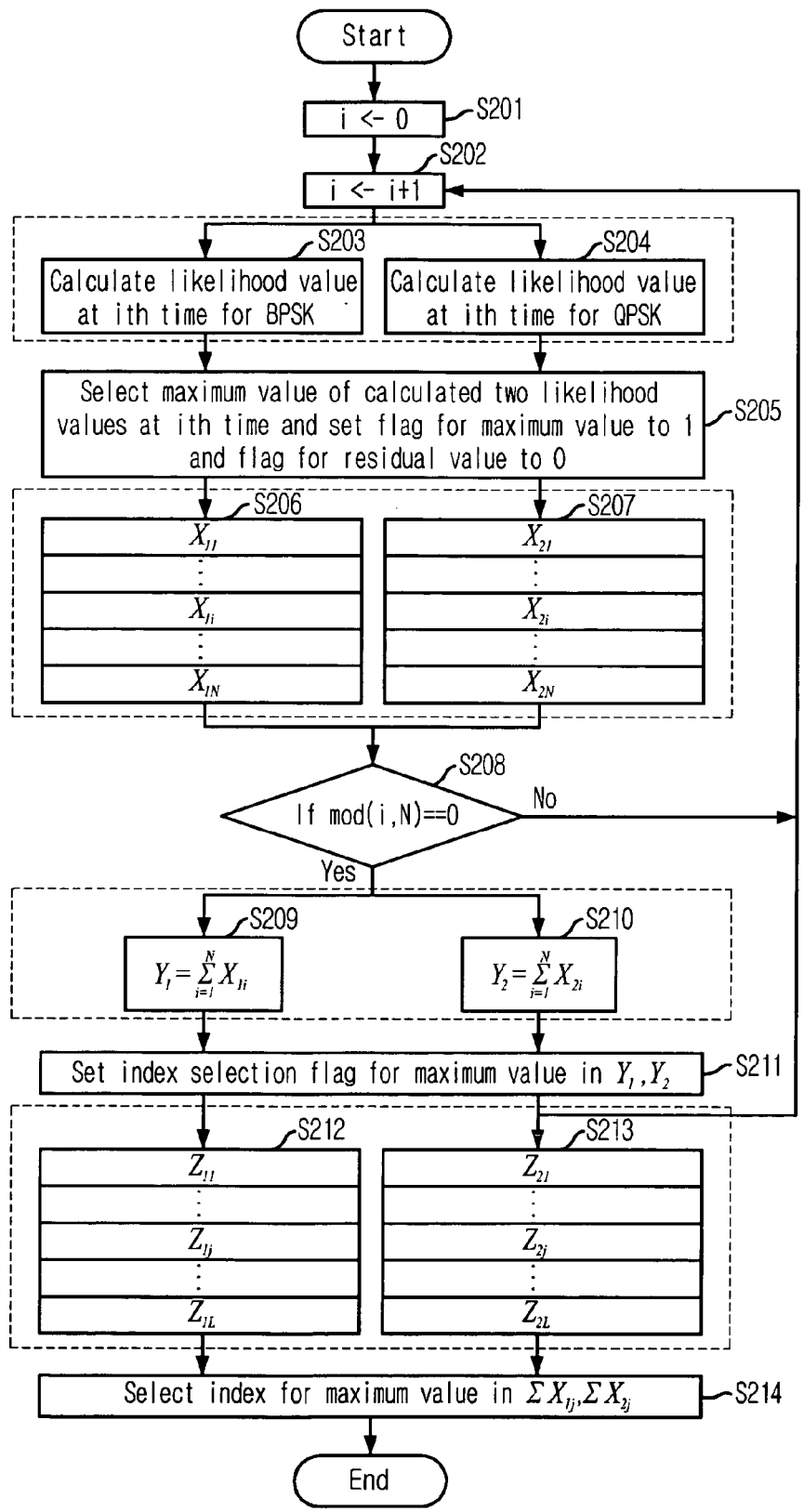

US 7,697,639 B2

APPARATUS AND METHOD FOR ROBUST BPSK/QPSK BLIND MODULATION CLASSIFICATION AGAINST ERRORS IN SATELLITE CONTROL SYSTEM

FIELD OF THE INVENTION

The present invention relates to an apparatus and a method for robust Binary Phase Shift Keying/Quadrature Phase Shift Keying (BPSK/QPSK) blind modulation classification against errors in a satellite communication system, and more particularly, to an apparatus and a method for robust BPSK/QPSK blind modulation classification against errors for classifying a modulation mode of received signal that bears noise under the circumstance that the modulation mode is not classified so as to robust against a frequency error, a phase error and a timing error.

DESCRIPTION OF RELATED ART

Recently, it has been considered that various modulation modes are adopted in a transmitter depending on a channel environment such as a weather condition between the transmitter and a receiver in a wireless communication system. According to such consideration, there are developed a variety of modulation classification methods up to now. Among those methods, there is a Maximum-Likelihood (ML) method that is good in classification performance but complex in calculation. This method is disclosed in Wen Wei and Jerry M. Mendel, entitled "A New Maximum-Likelihood Method for Modulation Classification," Signals, Systems and Computers, 1995. 1995 Conference Record of the Twenty-Ninth Asilomar Conference on, Vol. 2, pp. 132-1136, Oct. 30 through Nov. 2, 1995. To solve the above problem, there is proposed a quasi Log-Likelihood Ratio (qLLR) method by C. Y. Huang and A. Polydoros, entitled "Likelihood Method for MPSK Modulation Classification", IEEE Transactions On Communications, vol. 43, pp. 1493-1504, Feb./Mar./Apr. 1995.

However, all the methods as introduced above have a poor performance for a serious frequency error, a phase error and a timing error and thus make their implementation actually difficult, without a separate recovery circuit. These errors are errors that may be frequently taken place in communication systems and cause desired modulation classification performance to be not obtained when a separate demodulation block is not prepared in the communication systems.

There is proposed another modulation classification scheme that is less sensitive to the frequency error or phase error. However, this scheme has a drawback in that its performance is suddenly lowered when a severe frequency error or phase error is occurred.

Therefore, there has been a need for a scheme capable of performing a precise BPSK/QPSK modulation classification with only received baseband signal that is match-filtered without any separate help and also deciding the number of minimally required symbols to meet a desired Correct Classification Probability (CCP).

SUMMARY OF THE INVENTION

It is, therefore, a primary object of the present invention to provide an apparatus and a method for robust BPSK/QPSK blind modulation classification against errors in a satellite communication system which roughly makes its state normal by shortly setting an abnormal characteristic observation interval and has a more powerful performance under the abnormal communication environment by observing the roughly normal interval for several intervals so as to robust against a change of signal such as a frequency offset, a phase offset, or a timing offset.

In accordance with one aspect of the present invention, there is provided an apparatus for Binary Phase Shift Keying/Quadrature Phase Shift Keying (BPSK/QPSK) blind modulation classification in a satellite communication system, comprising: a first and a second likelihood value calculators for calculating a likelihood value of a received baseband signal for each of BPSK and QPSK modulation modes, respectively; a maximum value setting unit for deriving a maximum value of the likelihood values or ith likelihood ratios calculated by the first and the second likelihood value calculators and setting a flag for the maximum value to "1" and a flag for the remaining value to "0"; a first and a second flag combining units for summating values of the flags for the modulation modes, respectively; a modulation mode flag setting unit for selecting a maximum value from the flags combined by the first and the second flag combining units and setting a modulation mode flag corresponding to the selected value; and a modulation classification mode deciding unit for combining modulation flags obtained, that is, summating the values of modulation flags, by repeating the modulation classification processes in all of the elements L times and deciding a modulation classification mode having a greater flag value in combined two modulation flags as an actual modulation classification mode.

In accordance with another aspect of the present invention, there is provided a method for BPSK/QPSK blind modulation classification in a satellite communication system, comprising the steps of: calculating a likelihood ratio of a received baseband signal for each of BPSK and QPSK modulation modes; deriving a maximum value form the calculated likelihood ratios or ith likelihood ratios, setting a flag for the maximum value to "1" and a flag for the remaining value to "0", and storing set values in a buffer; combining the flags for each of the modulation modes; selecting a maximum value in the combined flags, that is, summated flag values, and setting a modulation mode flag corresponding to the selected value; and combining modulation flags obtained by repeatedly performing the modulation classification processes in the steps L times and deciding a modulation classification mode having a greater flag in combined two modulation flags as an actual modulation classification mode.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which:

FIG. 2 shows an exemplary flowchart of a method for robust BPSK/QPSK blind modulation classification against errors in a satellite communication system in accordance with a preferred embodiment of the invention;

DETAILED DESCRIPTION OF THE INVENTION

The above-mentioned objectives, features, and advantages will be more apparent by the following detailed description associated with the accompanying drawings; and thus, the invention will be readily conceived by those skilled in the art to which the invention pertains. Further, in the following description, well-known arts will not be described in detail if it seems that they could obscure the invention in detail unnecessarily. Hereinafter, a preferred embodiment of the present invention will be set forth in detail with reference to the accompanying drawings.

Figure 1:
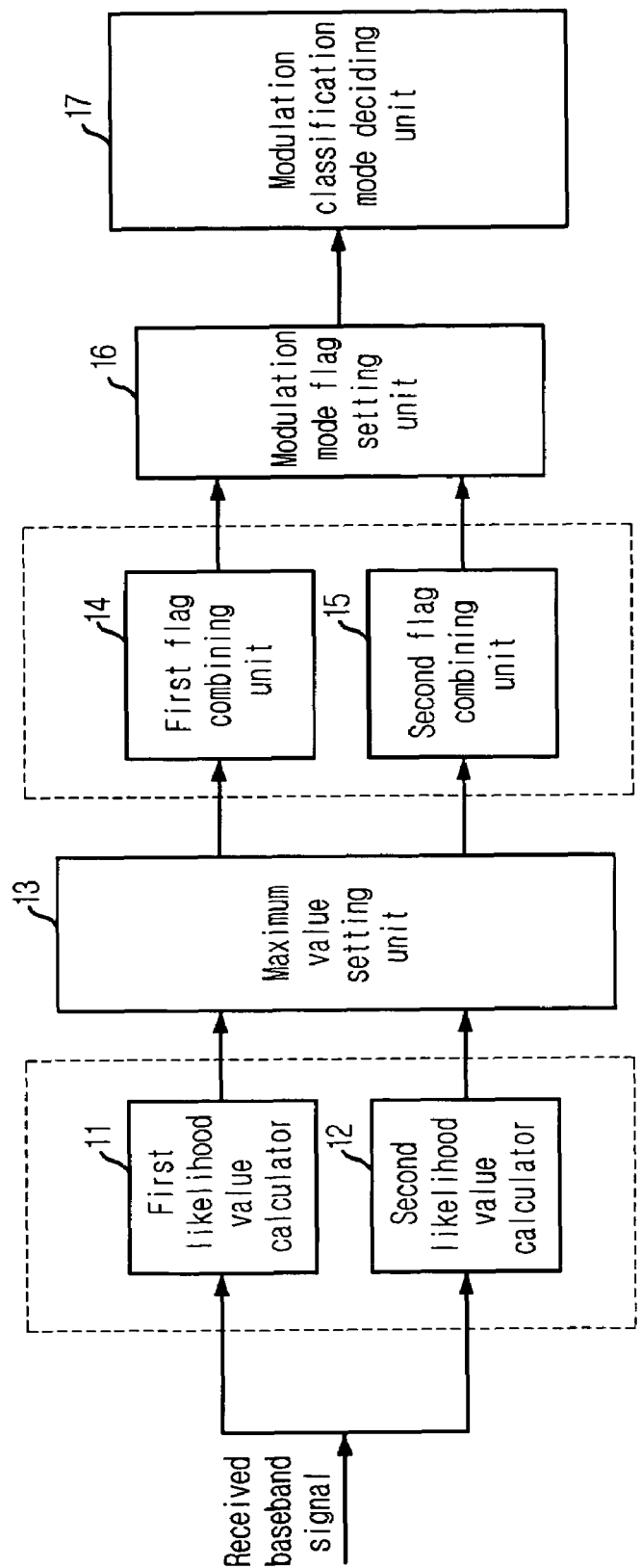
FIG. 1 is a block diagram showing a configuration of an apparatus for robust BPSK/QPSK blind modulation classification against errors in a satellite communication system in accordance with a preferred embodiment of the present invention.

FIG. 1 is a block diagram showing a configuration of an apparatus for robust BPSK/QPSK blind modulation classification against errors in a satellite communication system in accordance with a preferred embodiment of the present invention.

As shown therein, the inventive apparatus for robust BPSK/QPSK blind modulation classification against errors in a satellite communication system includes a first and a second likelihood value calculators 11 and 12, a maximum value setting unit 13, a first and a second flag combining units 14 and 15, a modulation mode flag setting unit 16, and a modulation classification mode deciding unit 17.

The first and second likelihood value calculators 11 and 12 calculate likelihood values of received baseband signals for BPSK and QPSK modulation modes, respectively. The maximum value setting unit 13 derives a maximum value of the likelihood values or ith likelihood ratios calculated by the first and second likelihood value calculators 11 and 12 and sets a flag for the maximum value to have a value "1" and a flag for the remaining value to have a value "0." The first and second flag combining units combine the flags for each modulation mode, respectively. Herein, "combining flags" means, for a simple example, summating the values of the flags.

The modulation mode flag setting unit 16 selects a maximum value of the flags combined by the first and second flag combining units 14 and 15 and setting the modulation mode flag corresponding to the selected value. The modulation classification mode deciding unit 17 combines modulation flags obtained by repeating all of the modulation classification processes in the above components L times and deciding a modulation classification mode having a greater flag of the two combined flags $$\sum_{i=1}^{L} Z_{k1} \text{ and } \sum_{i=1}^{L} Z_{k2}$$

and as an actual modulation classification mode.

In this configuration, each received baseband signal is represented as:

$$r_i = s_i e^{j2\pi\Delta f_0 i T_s + \theta_i} + n_i \qquad \text{Eq. (1)}$$

wherein $i(1 \leq i \leq Q)$ denotes the unit of symbol and sample operated as one sample per symbol, $S_i$ indicates a modulated signal sent from a transmitting end, N implies the number of samples to be observed for modulation classification, $n_i$ represents a Gaussian noise signal where a power spectrum density is No/2, and $\Delta f_0$ and $\theta_i$ denote a frequency error and a phase error, respectively.

Now, there will be given a detailed description of an operation of the apparatus for robust BPSK/QPSK blind modulation classification against errors in the satellite communication system in accordance with the invention having the configuration as mentioned above referring to FIG. 2.

FIG. 2 shows an exemplary flowchart of a method for robust BPSK/QPSK blind modulation classification against errors in a satellite communication system in accordance with a preferred embodiment of the invention.

As shown in FIG. 2, at steps S201 to 204, likelihood values of signals at an ith time for modulation mode j, BPSK and QPSK, to be modulation-classified are calculated by:

$$g(r_i | M_j) = \sum_{k=1}^{M_j} \frac{1}{M_j} e^{-\frac{|r_i - x_{kj}|^2}{N_0/2}} \qquad \text{Eq. (2)}$$

wherein $M_j$ is the number of possible modulated signals or points of constellation for the modulation mode j, and $x_{k,j}$ is a modulated signal for the modulation mode j.

Next, the process of the invention selects a maximum value from the two likelihood values at the ith time, and sets a flag for the maximum value to "1" and a flag for the remaining value to "0" at step S205. This can be defined as:

$$X_{1i} = 0, X_{2i} = 0 \qquad \text{Eq. (3)}$$
$$\text{if } \max(g(r_i | M_1), g(r_i | M_2)) == g(r_i | M_j)$$
$$X_{ji} = 1$$

where $X_{ji}$ is a flag at the ith time for the modulation mode j. The process of the invention conducts Eqs. (2) and (3) above until i reaches N starting from 1 at steps S201 to S205, and then stores flag $X_{ji}$ values in a buffer at steps S206 and S207.

And then, at steps S209 and S210, the process divides i by N and sums the values of flags of the modulation mode if the residual is 0 at step S208, which may be represented by Eq. (4) below; and returns step S202 to repeat the operations if the residual is not 0.

$$Y_j = \sum_{i=1}^{N} X_p, j = 1, 2 \qquad \text{Eq. (4)}$$

Subsequently, the process sets an index selection flag corresponding to a maximum value out of $Y_1$ and $Y_2$ summed through steps S209 and S210 above and determines a temporary modulation mode at step S211, which may be defined as follows:

$$K_k = \arg\max_j Y_j \qquad \text{Eq. (5)}$$

wherein $K_k$ is a modulation mode determined at a k($1 \leq k \leq L$)th stage. If $K_k$ is BPSK, then the process sets a BPSK flag $z_{k1}$ to 1 and a QPSK flag $z_{k2}$ to 0; and if $K_k$ is QPSK, the process sets a BPSK flag $z_{k1}$ to 0 and a QPSK flag $z_{k2}$ to 1 at step S212 and S213.

At a final step S214, the process selects and determines a modulation mode showing the maximum value at $$\sum_{i=1}^{L} Z_{k1} \text{ and } \sum_{i=1}^{L} Z_{k2}$$

for final modulation mode determination.

As described above, it can be seen that the present invention satisfies the relation of Q=NL. In other words, the present invention can propose a modulation classification mode as follows to improve the performance against a frequency error, a phase error and a timing error of wider range.

There is a method that determines a modulation mode having a more value among L modulation classification values as an actually used modulation mode if the number of signals to be modulation-classified, N, is fixed and the modulation classification result shows that L=Q/N number of independent modulation classification result values or modulation modes are obtained when the number of symbols to be observed as a whole is Q. The CCP of the structure proposed under the above assumption is as follows:

$$P_0 = \sum_{i=L/2}^{L} \binom{L}{i} p_0^i (1-p_0)^{L-i} \quad \text{Eq. (6)}$$

where $p_0$ indicates a CCP at a specific frequency offset, which is obtained by observing a short N symbol block. If L is sufficiently large, $P_c$ is given by:

$$P_c \equiv 1 - \Phi\left(\frac{L/2 - Lp_0}{\sqrt{Lp_0(1-p_0)}}\right) \quad \text{Eq. (7)}$$

where $\Phi(x) = \int_{-\infty}^{x} \frac{1}{\sqrt{2\pi}} e^{-t^2/2} dt.$

At this time, if it is intended to make a desired CCP above $P_{c0}$, the following relation should be satisfied.

$$\Phi\left(\frac{L/2 - Lp_0}{\sqrt{Lp_0(1-p_0)}}\right) \geq 1 - P_{c0} \quad \text{Eq. (8)}$$

Therefore, the following equation is obtained.

$$L \geq \frac{4p_0(1-p_0)}{(1-2p_0)^2} (\Phi^{-1}(1-P_{c0}))^2 \quad \text{Eq. (9)}$$

wherein $\phi^{-1}(x)$ is an inverse function of $\Phi(x)$. Thus, the whole number of required symbols is as follows:

$$Q = NL \geq \frac{4p_0(1-p_0)}{(1-2p_0)^2} (\Phi^{-1}(1-P_{c0}))^2 N \quad \text{Eq. (10)}$$

Figure 3A:
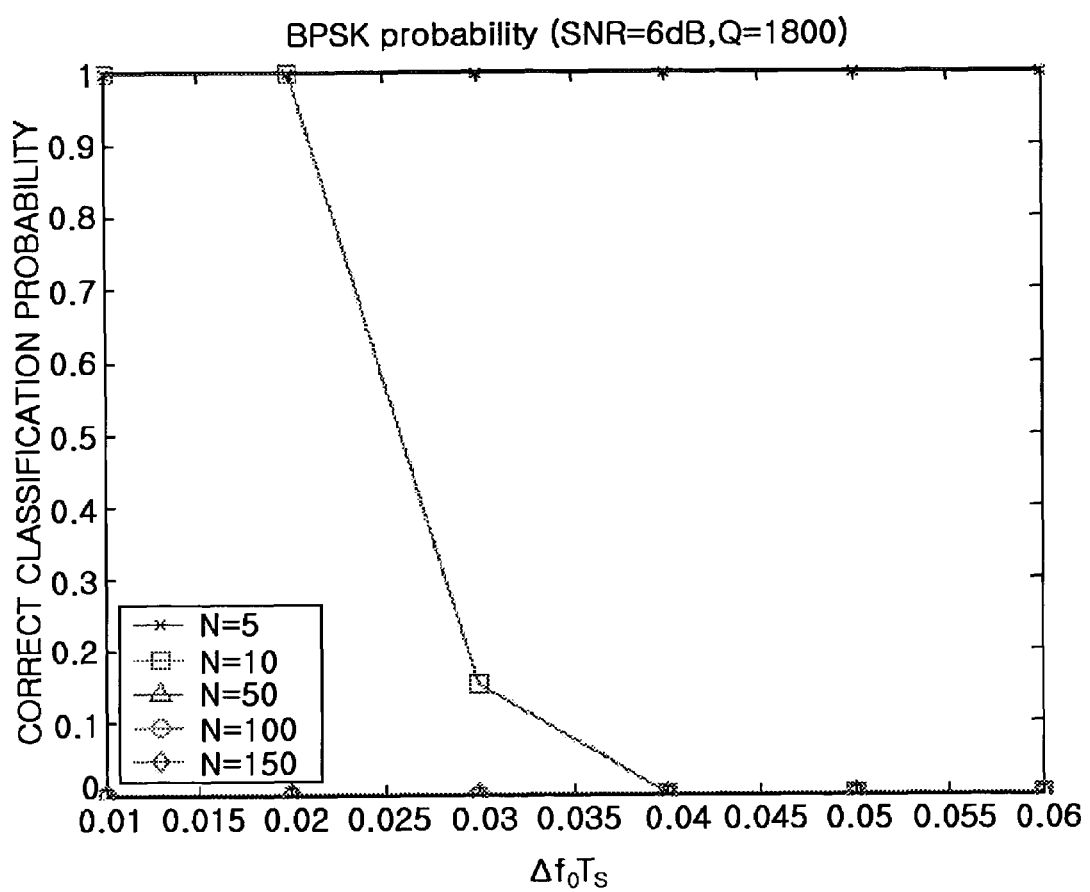
FIGS. 3A and 3B are graphs showing the performance of BPSK/QPSK modulation classification under the communication environment that bears a frequency error and a phase error in the BPSK/QPSK blind modulation classification apparatus of the present invention.
Figure 3B:
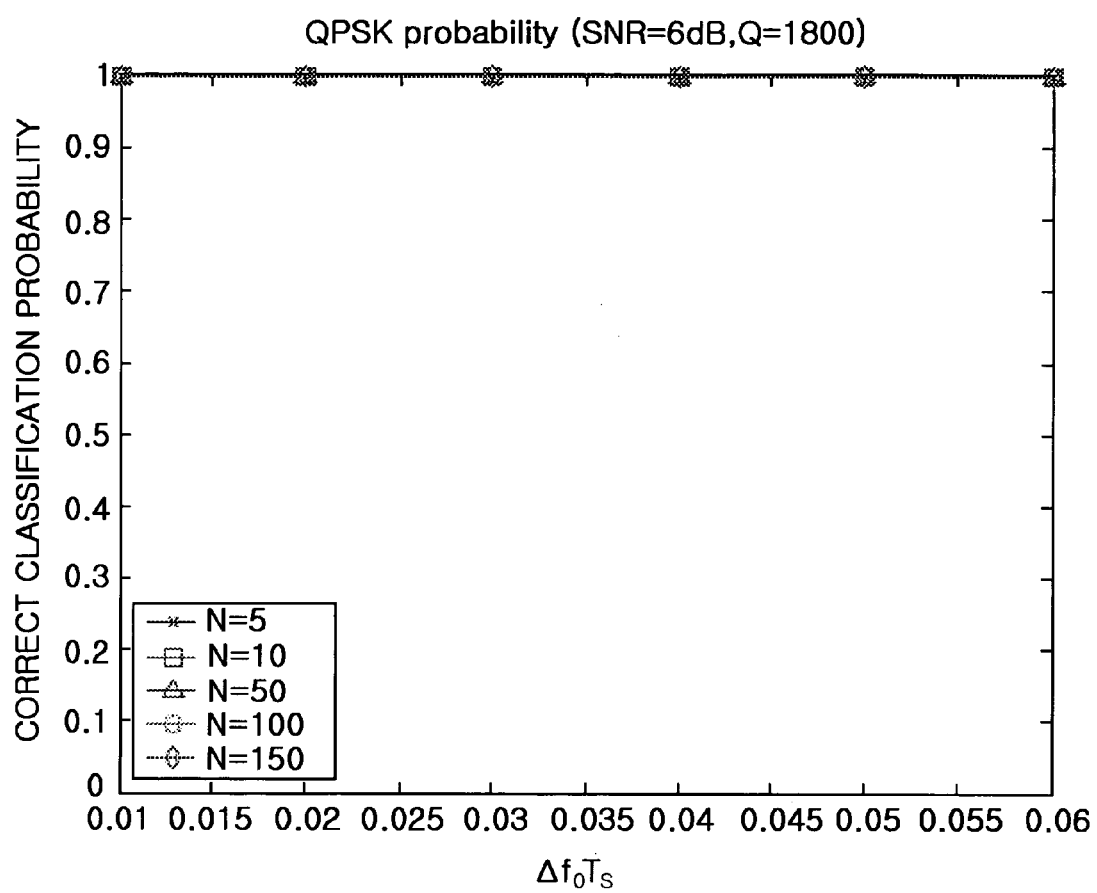

FIGS. 3A and 3B are graphs showing the performance of BPSK/QPSK modulation classification under the communication environment that bears a frequency error and a phase error in the BPSK/QPSK blind modulation classification apparatus of the present invention wherein a phase error SNR is 6 dB.

Figure 4A:
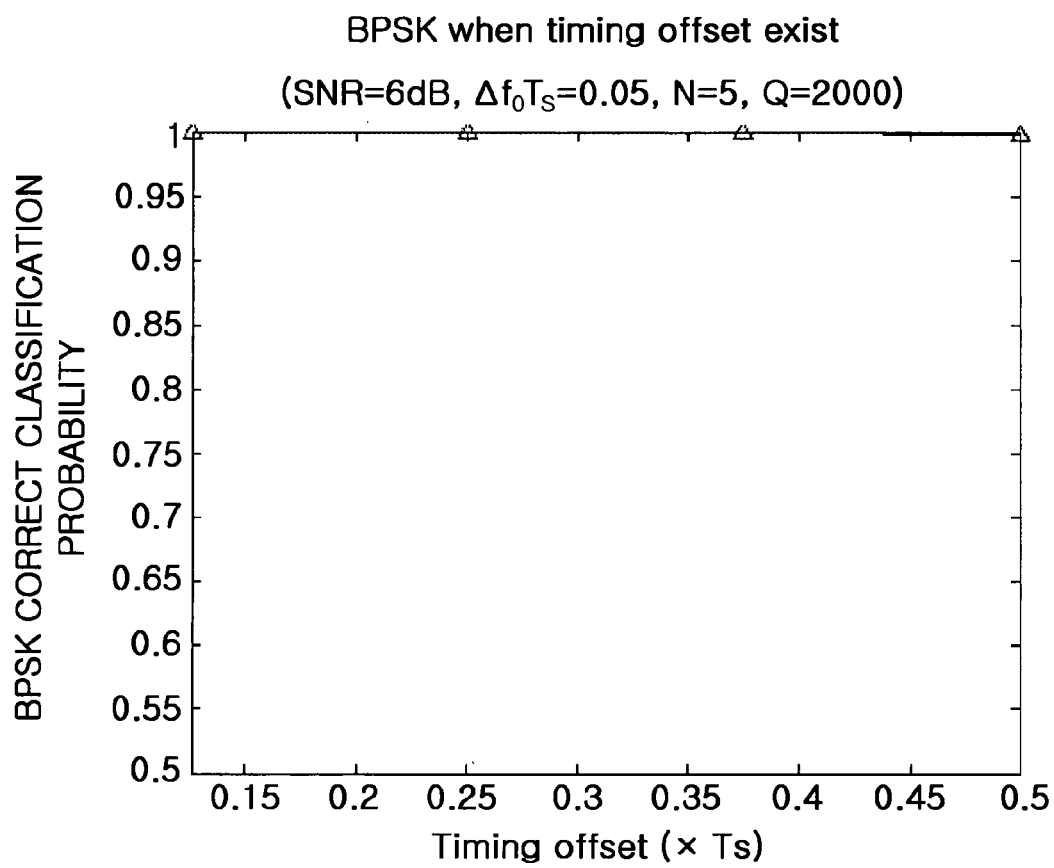
FIGS. 4A and 4B are graphs showing the performance of BPSK/QPSK modulation classification under the communication environment that bears a frequency error, a phase error and a timing error in the BPSK/QPSK blind modulation classification apparatus of the present invention.
Figure 4B:
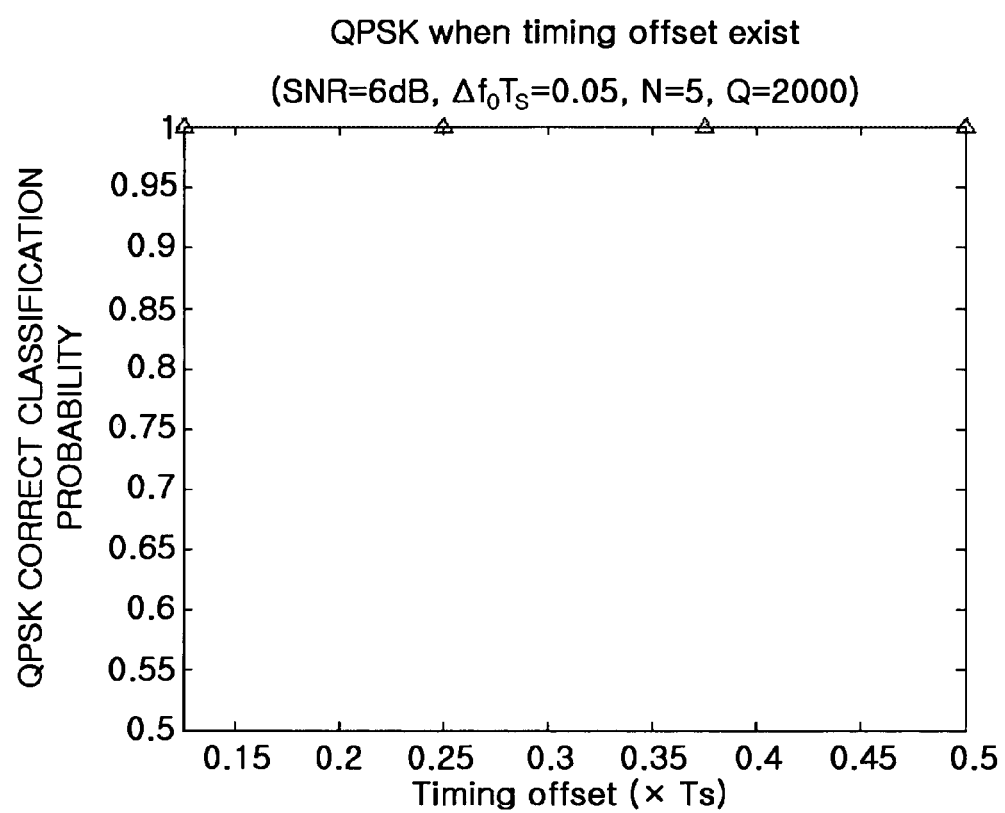

FIGS. 4A and 4B are graphs showing the performance of BPSK/QPSK modulation classification under the communication environment that bears a frequency error, a phase error and a timing error in the BPSK/QPSK blind modulation classification apparatus of the present invention wherein a normalized frequency error is 0.05, and a phase error SNR is 6 dB.

The present invention as mentioned above has a very powerful performance under the satellite communication environment that generally bears a frequency error, a phase error and a timing error. This can be confirmed from FIGS. 3A, 3B, 4A and 4B.

Therefore, the present invention can perfectly conduct the modulation classification if it is hardwarely applied to an actual system where SNR is 6 dB. Furthermore, the present invention has an additional merit that it can provide an algorithm capable of deciding the number of minimally required symbols to meet a desired CCP.

As a result, the present invention has an advantage in that it can achieve a perfect BPSK/QPSK modulation classification with only match-filtered received signal so that it can provide a very robust performance even under an abnormal communication environment like a frequency error, a phase error, and a timing error that may occur in an actual communication system, without extra recovery such as a frequency recovery, a phase recovery and a timing recovery. Moreover, the present invention has an additional merit that it can offer an algorithm capable of deciding the number of minimally required symbols to meet a desired CCP.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-0043905, filed with the Korean Intellectual Property Office on May 25, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for Binary Phase Shift Keying/Quadrature Phase Shift Keying (BPSK/QPSK) blind modulation classification in a satellite communication system, comprising:

a first and a second likelihood value calculating means for calculating a likelihood value of a received baseband signal for each of BPSK and QPSK modulation modes, respectively;

a maximum value setting means for obtaining a maximum value of the likelihood values or ith likelihood ratios calculated by the first and second likelihood value calculating means and setting a flag corresponding to the maximum value to have a first flag value and a flag corresponding to a remaining value to have a second flag value, wherein i is a positive integer;

a first and a second flag combining means for combining the flags for the modulation modes, respectively;

a modulation mode flag setting means for setting a corresponding modulation mode flag based upon the combining result; and a modulation mode deciding means for combining the modulation mode flags obtained by repeating a modulation classification processes in all of said means L times and deciding an actual modulation mode based upon combining the modulation mode flags result, wherein L is an integer greater than 1.

2. The apparatus as recited in claim 1, wherein the modulation mode deciding means decides a number of minimally required symbols to meet a desired Correct Classification Probability (CCP) based on the resultant values outputted by repeating the modulation classification processes L times.

3. The apparatus as recited in claim 1, wherein the first flag value is set to "1" and the second flag value is set to "0" in the maximum value setting means.

4. A method for BPSK/QPSK blind modulation classification in a satellite communication system, comprising the steps of:
   a) calculating a likelihood ratio of a received baseband signal for each of BPSK and QPSK modulation modes;
   b) deriving a maximum value from the calculated likelihood ratios or ith likelihood ratios, setting a flag for the maximum value to have a first flag value and a flag for the remaining value to have a second flag value, wherein i is a positive integer;
   c) combining the flags for each of the modulation modes and setting a corresponding modulation mode flag based upon the combining result; and
   d) combining the modulation mode flags obtained by repeatedly performing a modulation classification processes in the steps a) to c) L times and deciding an actual modulation mode based upon combining the modulation mode flags result, wherein L is an integer greater than 1.

5. The method as recited in claim 4, wherein the combined flags are obtained by combining flags for the modulation modes when a residual that is derived by dividing i by N is 0, which are calculated based on:

$$Y_j = \sum_{i=1}^{N} X_{ji}, \; j = 1, 2 \qquad \text{Eq. (1)}$$

wherein N is the number of samples to be observed and $X_{ji}$ is the flag of the jth modulation mode at ith time.

6. The apparatus as recited in claim 4, wherein the first flag value is set to "1" and the second flag value is set to "0" in the step b.

7. The method as recited in claim 4, wherein the modulation mode deciding step decides a number of minimally required symbols to meet a desired Correct Classification Probability (CCP) based on the resultant values provided by repeating the modulation classification processes L times.

8. The method as recited in claim 7, wherein the CCP is calculated by Eq. (2), and if L is sufficiently large, $P_c$ is represented by Eq. (3):

$$P_c = \sum_{i=L/2}^{L} \binom{L}{i} p_0^i (1-p_0)^{L-i} \qquad \text{Eq. (2)}$$

wherein $p_o$ indicates a CCP at a specific frequency offset obtained by observing a short N symbol block, and $$P_c \cong 1 - \Phi\left(\frac{L/2 - Lp_0}{\sqrt{Lp_0(1-p_0)}}\right) \qquad \text{Eq. (3)}$$

wherein $\Phi(x) = \int_{-\infty}^{x} \frac{1}{\sqrt{2\pi}} e^{p/2} dt$.

9. The method as recited in claim 8, wherein the number of minimally required symbols to meet the CCP, which is defined as:

$$Q = NL \geq \frac{4p_0(1-p_0)}{(1-2p_0)^2}(\Phi^{-1}(1-P_{c0}))^2 N$$

wherein N is the number of samples to be observed and Pco is a threshold probability to decide the modulation mode (BPSK/QPSK).

* * * * *